United States Patent
Rowlay

(10) Patent No.: US 10,661,365 B2
(45) Date of Patent: May 26, 2020

(54) FOLDING MULTI SAW

(71) Applicant: Stanley Black & Decker, Inc., New Britain, CT (US)

(72) Inventor: Stephen Rowlay, Derbyshire (GB)

(73) Assignee: Stanley Black & Decker, Inc., New Britain, CT (US)

( * ) Notice: Subject to any disclaimer, the term of this patent is extended or adjusted under 35 U.S.C. 154(b) by 402 days.

(21) Appl. No.: 15/290,033

(22) Filed: Oct. 11, 2016

(65) Prior Publication Data

US 2018/0099339 A1    Apr. 12, 2018

(51) Int. Cl.
*B23D 51/10* (2006.01)
*B23D 49/10* (2006.01)
*B26B 1/04* (2006.01)

(52) U.S. Cl.
CPC ............ *B23D 51/10* (2013.01); *B23D 49/10* (2013.01); *B26B 1/042* (2013.01); *B26B 1/046* (2013.01)

(58) Field of Classification Search
CPC ...... B23D 51/10; B23D 51/01; B23D 49/167; B23D 49/10; B23D 51/08; B26B 5/00; B26B 5/001; B26B 1/042; B26B 1/046
USPC ................. 30/161, 260, 157–158, 236, 331, 30/392–393, 330, 339, 342; 279/30, 905
See application file for complete search history.

(56) References Cited

U.S. PATENT DOCUMENTS

| | | | |
|---|---|---|---|
| 4,233,737 A | 11/1980 | Poehlmann | |
| 4,918,820 A | 4/1990 | Korb et al. | |
| 5,327,651 A * | 7/1994 | Favreau | B26B 1/042 30/161 |
| 5,443,276 A | 8/1995 | Nasser et al. | |
| 5,661,908 A | 9/1997 | Chen | |
| 5,722,168 A | 3/1998 | Huang | |
| 5,930,902 A | 8/1999 | Hsu | |
| 5,979,065 A | 11/1999 | Hsu | |
| 6,189,217 B1 * | 2/2001 | Melvin | B23D 51/03 30/125 |
| 6,434,831 B2 * | 8/2002 | Chen | B26B 1/046 30/155 |
| 6,516,525 B2 | 2/2003 | Liu | |
| 6,694,624 B2 | 2/2004 | Stefanopulos et al. | |
| 6,745,480 B1 * | 6/2004 | Liao | B23D 49/14 30/519 |
| 6,893,026 B2 * | 5/2005 | Yoshimura | B23D 51/10 279/29 |
| 6,915,577 B2 | 7/2005 | Scala | |

(Continued)

*Primary Examiner* — Laura M Lee
(74) *Attorney, Agent, or Firm* — Gabriel A. Haboubi

(57) ABSTRACT

A tool includes a housing, a blade receptacle within the housing configured to receive a removable saw blade having a lock engaging region, and a blade release actuator adjacent to the blade receptacle, the blade release actuator being rotatable about an axis associated therewith and configured to selectively move a lock member into the lock engaging region. The blade release actuator comprises a ramp on which the lock member rests. Rotation of the blade release actuator rotates the ramp under the lock member from a blade locked position where the lock member is pushed by the ramp into the lock engaging region of the removable saw blade to a blade release position where the ramp is rotated to create a gap between the lock engaging region and the blade release actuator such that the saw blade is removable from the tool.

16 Claims, 10 Drawing Sheets

(56) References Cited

U.S. PATENT DOCUMENTS

| | | | |
|---|---|---|---|
| 7,003,833 B2 * | 2/2006 | Feliciano | B25F 1/04 |
| | | | 30/155 |
| 7,065,885 B1 | 6/2006 | Chen | |
| 7,093,367 B1 | 8/2006 | Huang | |
| 7,210,232 B2 | 5/2007 | Guo | |
| 7,325,314 B1 | 2/2008 | Chen | |
| 7,370,421 B2 | 5/2008 | Onion et al. | |
| 7,380,341 B2 | 6/2008 | Ping | |
| 7,536,788 B2 * | 5/2009 | VanHoy | B26B 1/02 |
| | | | 30/154 |
| 7,600,458 B2 | 10/2009 | Hampton et al. | |
| 7,716,839 B2 | 5/2010 | Onion et al. | |
| 7,814,664 B2 | 10/2010 | Leblanc et al. | |
| 8,069,569 B2 | 12/2011 | Brown et al. | |
| 8,528,215 B2 | 9/2013 | Elsener | |
| 8,707,564 B2 | 4/2014 | Burch et al. | |
| 8,826,549 B2 | 9/2014 | Da Graca | |
| D732,367 S | 6/2015 | Parker et al. | |
| D738,182 S | 9/2015 | Parker et al. | |
| D742,716 S | 11/2015 | Parker et al. | |
| 2004/0012161 A1 * | 1/2004 | Chiu | B23D 51/10 |
| | | | 279/30 |
| 2005/0055833 A1 * | 3/2005 | Scarla | B26B 1/02 |
| | | | 30/156 |
| 2008/0092400 A1 | 4/2008 | Circosta et al. | |
| 2009/0217536 A1 | 9/2009 | Medhurst | |
| 2010/0299935 A1 | 12/2010 | Ping | |
| 2012/0180325 A1 | 7/2012 | Wu et al. | |
| 2013/0247392 A1 * | 9/2013 | Neitzell | B23D 51/10 |
| | | | 30/392 |
| 2013/0318798 A1 | 12/2013 | Elsener | |
| 2014/0366388 A1 | 12/2014 | Green | |
| 2015/0245564 A1 | 9/2015 | D'Acquisto | |

\* cited by examiner

US 10,661,365 B2

FOLDING MULTI SAW

FIELD OF THE INVENTION

The present invention relates generally to hand tools.

BACKGROUND OF THE INVENTION

Multi saws are often configured to house a replaceable saw blades, which can selectively retract into or extend out of the handle of the utility knife. Some conventional multi saws are configured to receive removable hacksaw blades, which are elongated blades conventionally supported at opposite ends thereof. In many multi saws, the handle is configured to support a hacksaw blade installed thereon at one end and/or at one or more intermediate positions along the length of the hacksaw blade. Other conventional multi saws are configured to receive removable jab saw blades, while still other conventional multi saws are configured to receive removable reciprocating saw blades. Some multi saws are configured to permit folding of certain saw blades into the handle of the multi saw for storage. For example, one such folding multi saw is described in U.S. Pat. No. 4,660,284.

Among other things, the present application relates to an improved folding multi saw configured to receive replaceable saw blades therein while facilitating quick replacement of such blades.

SUMMARY OF THE INVENTION

According to one aspect of this disclosure, a tool includes a housing, a blade receptacle within the housing configured to receive a removable saw blade having a lock engaging region, and a blade release actuator adjacent to the blade receptacle, the blade release actuator being rotatable about an axis associated therewith and configured to selectively move a lock member into the lock engaging region. The blade release actuator comprises a ramp on which the lock member rests. Rotation of the blade release actuator rotates the ramp under the lock member from a) a blade locked position where the lock member is pushed by the ramp into the lock engaging region of the removable saw blade when positioned in the blade receptacle to lock the removable saw blade relative to the tool, to b) a blade release position where the ramp is rotated to create a gap between the lock engaging region and the blade release actuator such that the saw blade is removable from the tool.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of multi saws in accordance with one or more embodiments are shown in the drawings, in which like reference numerals designate like elements. The drawings form part of this original disclosure in which.

DETAILED DESCRIPTION OF THE ILLUSTRATED EMBODIMENT(S)

Figure 1:
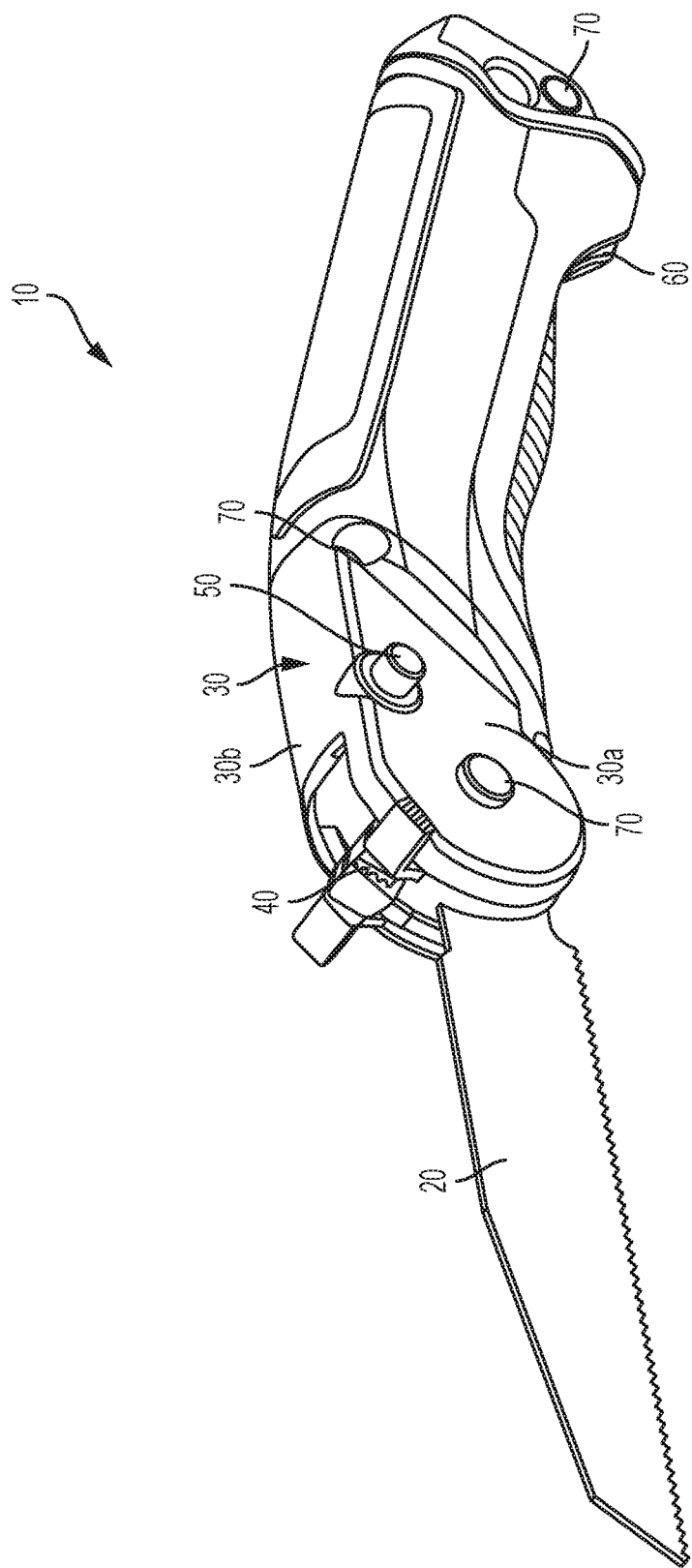
FIG. 1 illustrates a top left perspective view of a multi saw according to an aspect of the present disclosure, with a removable reciprocating saw blade installed into and held in an unfolded configuration in the multi saw.
Figure 2:
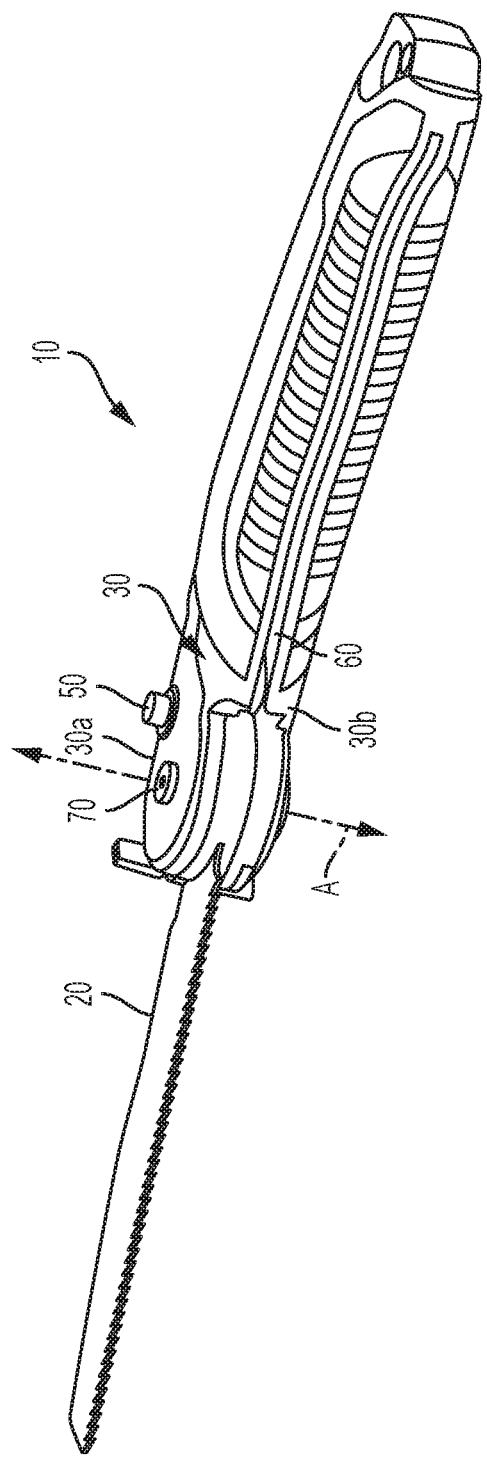
FIG. 2 illustrates a bottom left perspective view of the multi saw of FIG. 1.

FIGS. 1 and 2 illustrate perspective views of multi saw 10 of the present disclosure. Multi saw 10 is configured to selectively receive removable blades, such as reciprocating saw blades 20, into housing 30 thereof. As described in greater detail herein, multi saw 10 includes a blade release actuator 40 which engages or disengages the multi saw 10 holding onto a reciprocating saw blade 20. As further described herein, it may be appreciated that in some embodiments the multi saw 10 may be configured such that the saw blade 20 may be pivotable relative to the housing 30. As such, in the illustrated embodiment the housing 30 carries a blade pivot actuator 50 which when activated may permit folding the reciprocating saw blade 20 into an opening 60 in the housing 30 via rotation of the saw blade 20 about an axis A described in greater detail below. As shown in the illustrated embodiment, the housing 30 may be formed from separate housing portions that are assembled together (e.g., via screws, bolts, rivets, welds, etc.) but are shaped to form the opening 60 therebetween. Specifically, in the illustrated embodiment the housing 30 is formed from a left housing side 30a and a right housing side 30b, assembled together by screws 70. In other embodiments, the housing 30 may be formed of a uniform construction (e.g., may be cast, molded, etc.) but shaped with the opening 60 therein.

Figure 3:
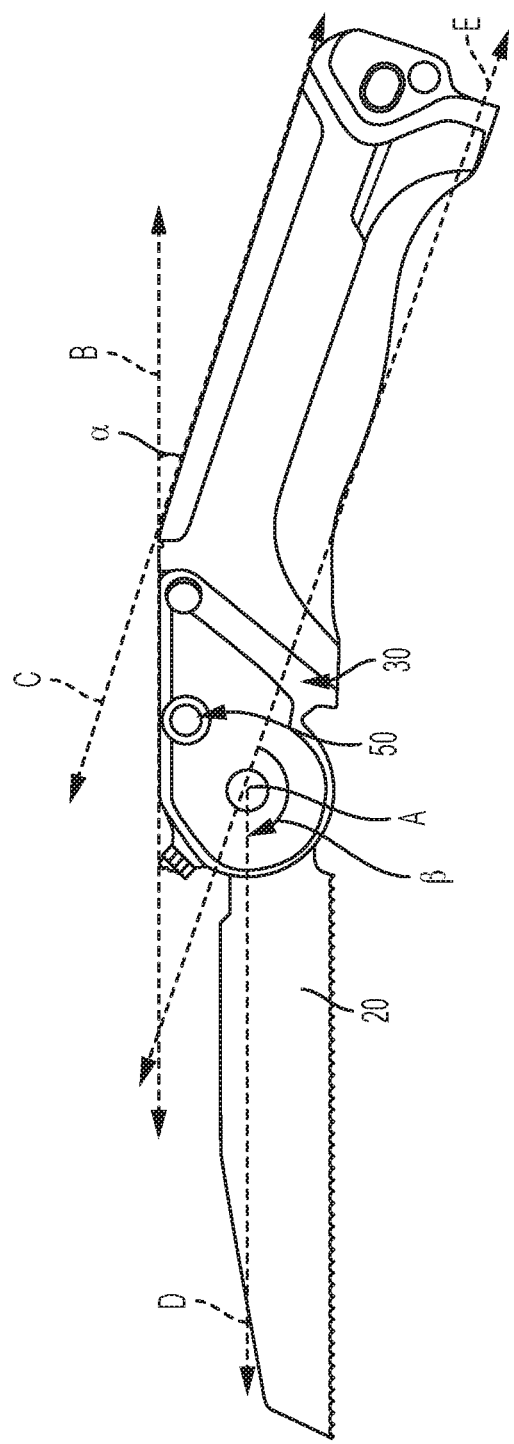
FIG. 3 illustrates a left side view of the multi saw of FIG. 1.

It may be appreciated that the housing 30 of the multi saw 10 may itself have a multi-faceted configuration in some embodiments, which may facilitate a user holding the multi saw 10 while the reciprocating saw blade 20 is pivoted at different angles with respect to the housing 30. As shown in FIG. 3, in an embodiment the housing 30 may include a first axis of extension B and a second axis of extension C along which the housing 30 may alternatively extend. In an embodiment, the first axis of extension B may intersect the second axis of extension C at an angle α. It may be appreciated that the angle α may vary across embodiments. For example, in some embodiments, the angle α may be approximately between 0° and 45°. As shown in the illustrated embodiment, in some embodiments, the angle α may be approximately 20°. As shown, a forward part of the housing 30 adjacent to the saw blade 20 may generally extend along the first axis of extension B, before diverting and generally extending along the second axis of extension C, which provides a grip for the user to hold the multi saw 10. As further shown in FIG. 3, the saw blade 20 may generally extend along a ray of blade extension D which terminates at and is generally perpendicular to the axis A. As such, it may be appreciated that the ray D may rotate about the axis A depending on the rotation of the saw blade 20, and may thus form different angles with respect to the housing 30 depending on the angle of rotation of the blade 20.

Figure 4:
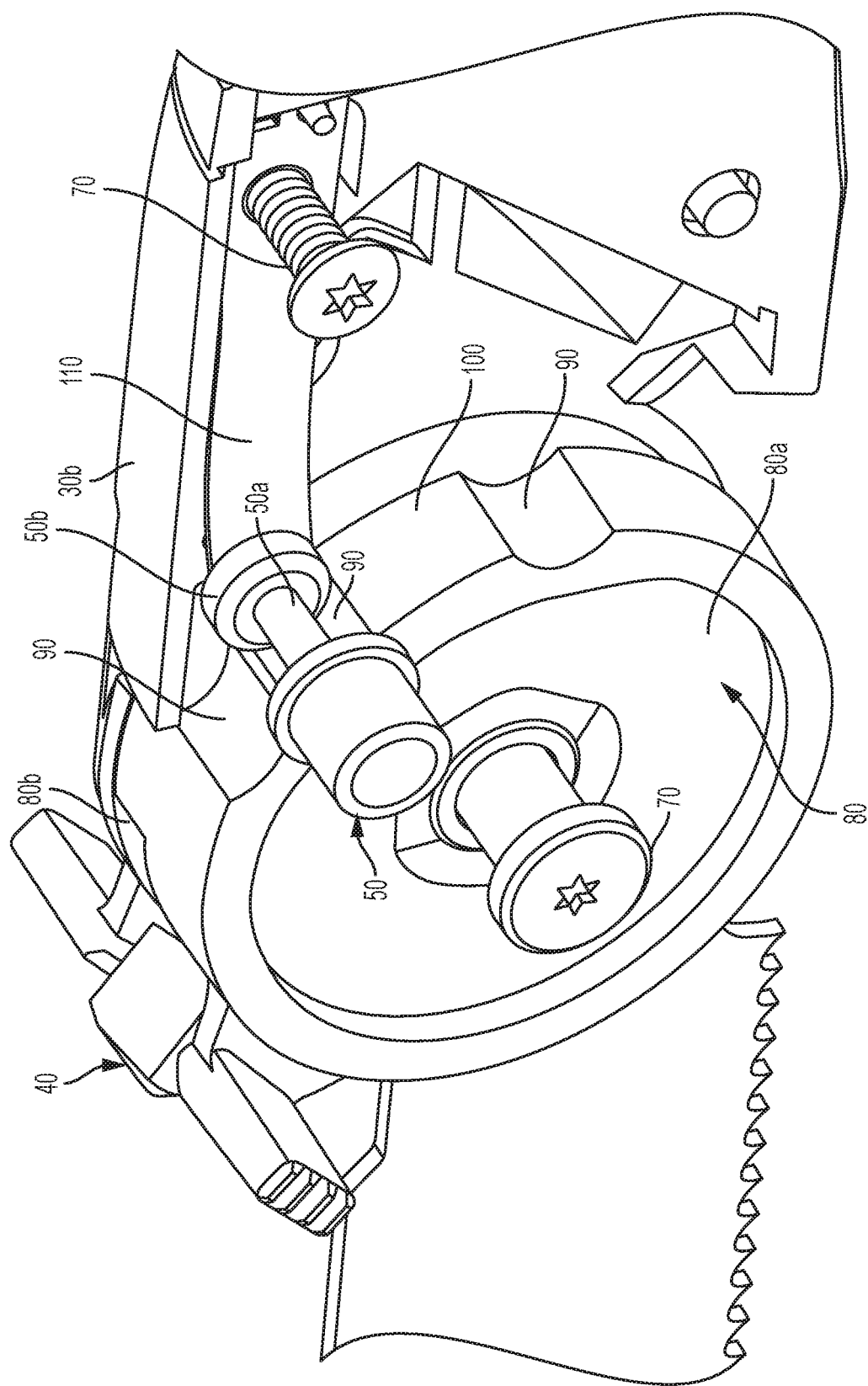
FIG. 4 illustrates a left perspective view of the multi saw of FIG. 1, with the side of the housing removed.

The illustrated embodiment of the mechanism by which the reciprocating saw blade 20 may be pivotable into and out of the housing 30 is more clearly appreciated with reference to FIG. 4, where the left housing side 30a has been removed. As shown, a blade receptacle 80 is held by the housing 30 (e.g., between left housing side 30a and right housing side 30b). In an embodiment, the blade receptacle 80 includes the blade release actuator 40 therein. As discussed in greater detail below, in an embodiment the blade receptacle 80 may receive the blade release actuator 40 between a left receptacle side 80a and a right receptacle side 80b. As further shown in FIG. 4, in an embodiment the blade receptacle 80 includes indents 90 formed at an outer periphery 100 thereof. While in some embodiments the outer periphery 100 may be formed by both the left receptacle side 80a and the right receptacle side 80b (e.g., with a seam extending therebetween), in other embodiments one of the left receptacle side 80a and the right receptacle side 80b may serve as a cap, while the bulk of the outer periphery 100 is formed by the other of the left receptacle side 80a and the right receptacle side 80b. In the illustrated embodiment, for example, it may be appreciated that the outer periphery 100 of the blade receptacle 80 and the indents 90 therein are formed on the left receptacle side 80a.

In an embodiment, the blade pivot actuator 50 may be generally cylindrical, with regions of differing diameter, where a region of greater diameter 50a may be sized to protrude into the indents 90, preventing rotation of the blade receptacle 80 relative to the housing 30, while regions of smaller diameter 50b would not extend into the indents 90, and thus would allow rotation of the blade receptacle 80 with the outer periphery 100 rotating adjacent to the regions of smaller diameter 50b of the blade pivot actuator 50. In an embodiment the blade pivot actuator 50 is movable laterally so the regions of greater diameter 50a or the regions of smaller diameter 50b may alternatively be positioned adjacent to or into the indents 90. It may be appreciated that the blade pivot actuator 50 may be biased (e.g., via leaf spring 110 in the illustrated embodiment, or other bias arrangements such as coil springs or resilient material in other embodiments) so as to normally hold the blade pivot actuator 50 so that the region of greater diameter 50a is within the indents 90 when such indents 90 are rotated to be appropriately aligned with the blade pivot actuator 50.

As such, the blade pivot actuator 50 may generally hold the blade receptacle 80 into a position associated with engagement between the region of greater diameter 50a and an associated one of the indents 90. For example, there may be an indent 90 associated with the blade receptacle 80 holding the saw blade 20 fully extended from the forward part of the housing 30 (e.g., such that the saw blade 20 and thus the ray D extends generally parallel to the axis of extension B). In an embodiment, there may be an indent 90 associated with the blade receptacle 80 holding the saw blade 20 fully extended relative to the rear portion of the housing 30 (e.g., such that the saw blade 20 and thus the ray D extends generally parallel to the axis of extension C). As discussed in greater detail below, in an embodiment there may be an indent 90 associated with the blade receptacle 80 holding the saw blade 20 within the housing 30 (e.g., the ray D may again extend generally parallel to the axis C, however the saw blade 20 extends within the handle 30 rather than protruding out of it).

In some embodiments other angles of extension may be formed by having additional indents 90. For example, it may be appreciated that in an embodiment a reference axis of extension E may be defined as parallel to the axis C, however intersecting the axis A about which the ray D may rotate. As such, the extension of the saw blade 20 may be defined by a variable angle β which the movable ray D forms with respect to the reference angle of extension E. Accordingly, in some embodiments, the angle β may be 180° when the saw blade 20 is held fully extended from the housing 30 (e.g., such that the ray D extends along the axis E forward of the housing 30. In some embodiment the angle β may be 0° when the saw blade 20 is held within the housing 30 (e.g., where the ray D extends along the axis E inside the housing 30). In some embodiments respective indents 90 may be associated with the blade receptacle 80 holding the saw blade 20 at one or more of a 180° angle, 160° angle, 135° angle, 115° angle, 90° angle, 45° angle, and 0° angle with respect to the grip of the housing 30 (e.g., such that the angle β is one of 180°, 160°, 135°, 115°, 90° 45° and 0°). In some embodiments, the blade receptacle 80 may be configured to hold the saw blade 20 in a manner that provides adequate clearance for fingers holding the housing 30 when the saw blade 20 is adjacent to a surface extending perpendicular to a surface being cut by the saw blade 20. For example, in an embodiment, an indent 90 may be associated with the blade receptacle 80 holding the saw blade 20 so that the angle β is between 180° and 270°. In the embodiment of the pivotable blade receptacle 80 shown in FIG. 5, it may be appreciated that the indent 90a may correspond with the saw blade 20 being held such that the ray D extends parallel to the axis B, while the indent 90b may correspond with the saw blade 20 being held such that the ray D extends parallel to the axis C, and the indent 90c may correspond with the saw blade 20 being held such that the ray D extends perpendicular to the axis C.

Again, rotation of the saw blade 20 by rotation of the blade receptacle 80 may be undertaken by depressing the blade pivot actuator 50 to move the region of greater diameter 50a out of alignment with the indents 90, and thus move the region of smaller diameter 50b into the space adjacent to the indent 90 so that the blade receptacle 80 can be rotated to bring different indent 90 into coplanar alignment with the region of greater diameter 50a, so that the blade pivot actuator 50 may reengage holding the blade receptacle 80 in place by the region of greater diameter 50a moving into the aligned indent 90 (e.g., automatically by the bias of the leaf spring 110 in some embodiments). It may be appreciated that other structures and mechanisms facilitating rotation of the blade receptacle 80 may be implemented in other embodiments. It may also be appreciated that in some embodiments the blade receptacle 80 may be fixed and/or integral to the housing 30.

Figure 5:
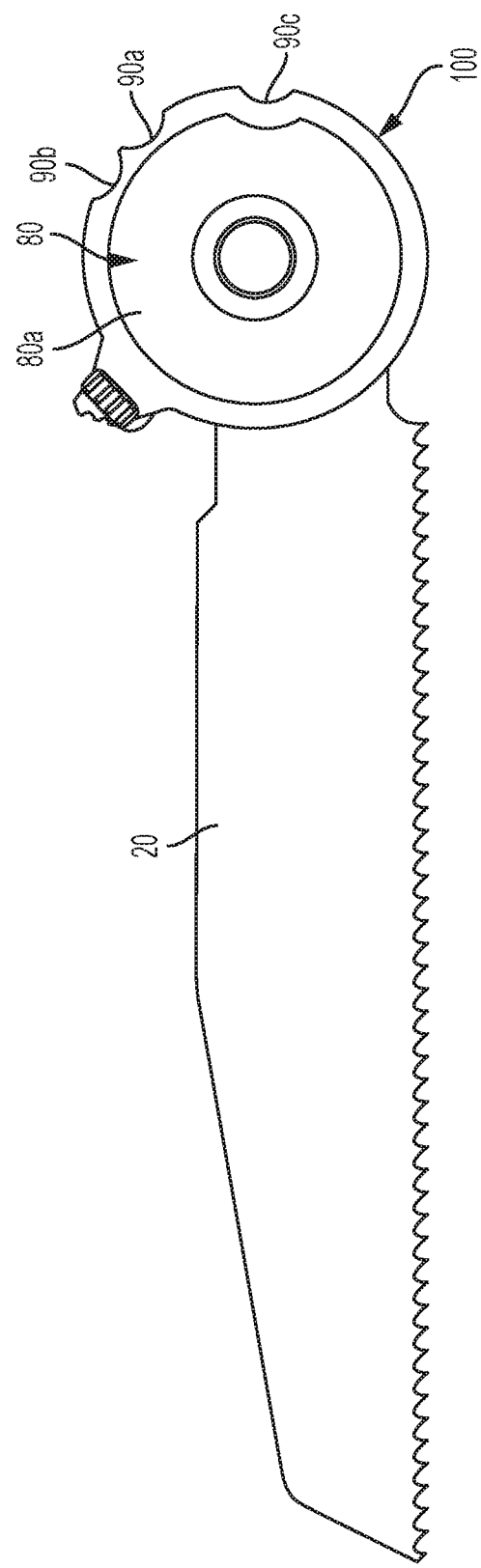
FIG. 5 illustrates an isolated left side view of a blade receptacle of the multi saw of FIG. 1.
Figure 6:
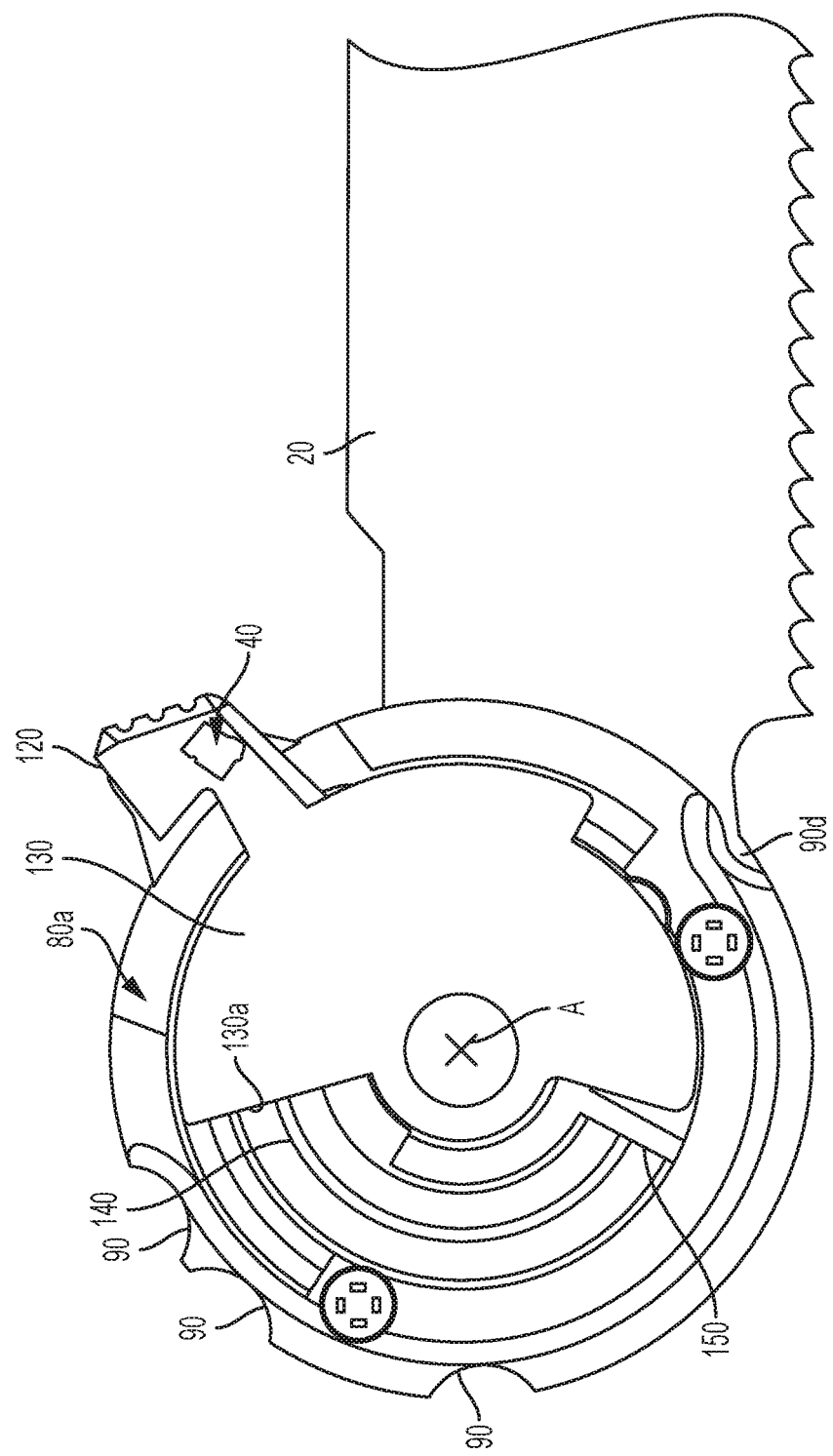
FIG. 6 illustrates an isolated right side view of the blade receptacle of FIG. 5, with a right side housing portion thereof removed.

FIG. 6 shows an opposite view of the blade 20 and blade receptacle 80 than the view of FIG. 5 (i.e., where FIG. 5 views the left receptacle side 80*a*, FIG. 6 is viewed from the side of the right receptacle side 80*b*). As shown in FIG. 6, an indent 90*d* may be provided corresponding with the saw blade 20 being held such that the ray D extends generally along the axis D inside the housing 30. It may be appreciated that in some embodiments, such as that illustrated, the indent 90*d* may be a partial indent so that the saw blade 20 is not locked in the position stored within the housing 30, but rather is biased within the housing 30 so that the saw blade 20 can be extended out of the housing 30 without necessitating pressing the blade pivot actuator 50 as an initial step. It may be appreciated from FIG. 4 and FIG. 6 that the partial indent 90*d* may be shaped to receive a tapered portion of the region of smaller diameter 50*b*. Accordingly, the bias of the saw blade 20 into the housing 30 may be accomplished by the leaf spring 110 pressing the tapered portion of the region of smaller diameter 50*b* into the partial indent 90*d* (which may itself be tapered), such that pulling on a back end of the saw blade 20 outward from the housing 30 may cause the tapered portion of the region of smaller diameter 50*b* to slip against the force of the pull, overcoming the bias from the leaf spring 110, and allowing the saw blade 20 to extend. It may be appreciated that when the saw blade 20 and blade receptacle 80 are rotated such that another of the indents 90 becomes aligned with the blade pivot actuator 50, the bias of the blade pivot actuator 50 may lock the saw blade 20 and blade receptacle 80 into that associated position until a user depresses the blade pivot actuator to remove the engagement, and allow further rotation of the saw blade 20 and blade receptacle 80.

In the view of FIG. 6, the right receptacle side 80*b* has been removed, so that the interior of the blade receptacle 80 can be appreciated. As shown, the blade release actuator 40 received in the blade receptacle 80 may comprise a protruding engagement member 120 that extends out of a gap formed between the left receptacle side 80*a* and the right receptacle side 80*b*, and is engageable by a user of the multi saw 10 so as to rotate a plate 130 within the blade receptacle 80 that is fixed relative to the protruding engagement member 120. It may be appreciated from FIG. 6 that the blade release actuator 40 may rotate about the axis A, through which a fastener 70 is normally received in various embodiments. In some embodiments, such as that shown, the plate 130 and the protruding engagement member 120 of the blade release actuator 40 may be of a unitary construction. In an embodiment one or more of the plate 130 the left receptacle side 80*a* and the right receptacle side 80*b* may be shaped to receive a spring 140 or other resilient member which may bias the blade release actuator 40 into a blade engaging position. For example, in the illustrated embodiment, a wall 130*a* may abut the spring 140 and may compress the spring 140 against a corresponding wall 150 on the right receptacle side 80*b* as the blade release actuator 40 is moved from a blade locked position such as that shown, to a blade release position where the blade release actuator 40 is rotated counterclockwise relative to the left receptacle side 80*a* in the view of FIG. 6.

Figure 7:
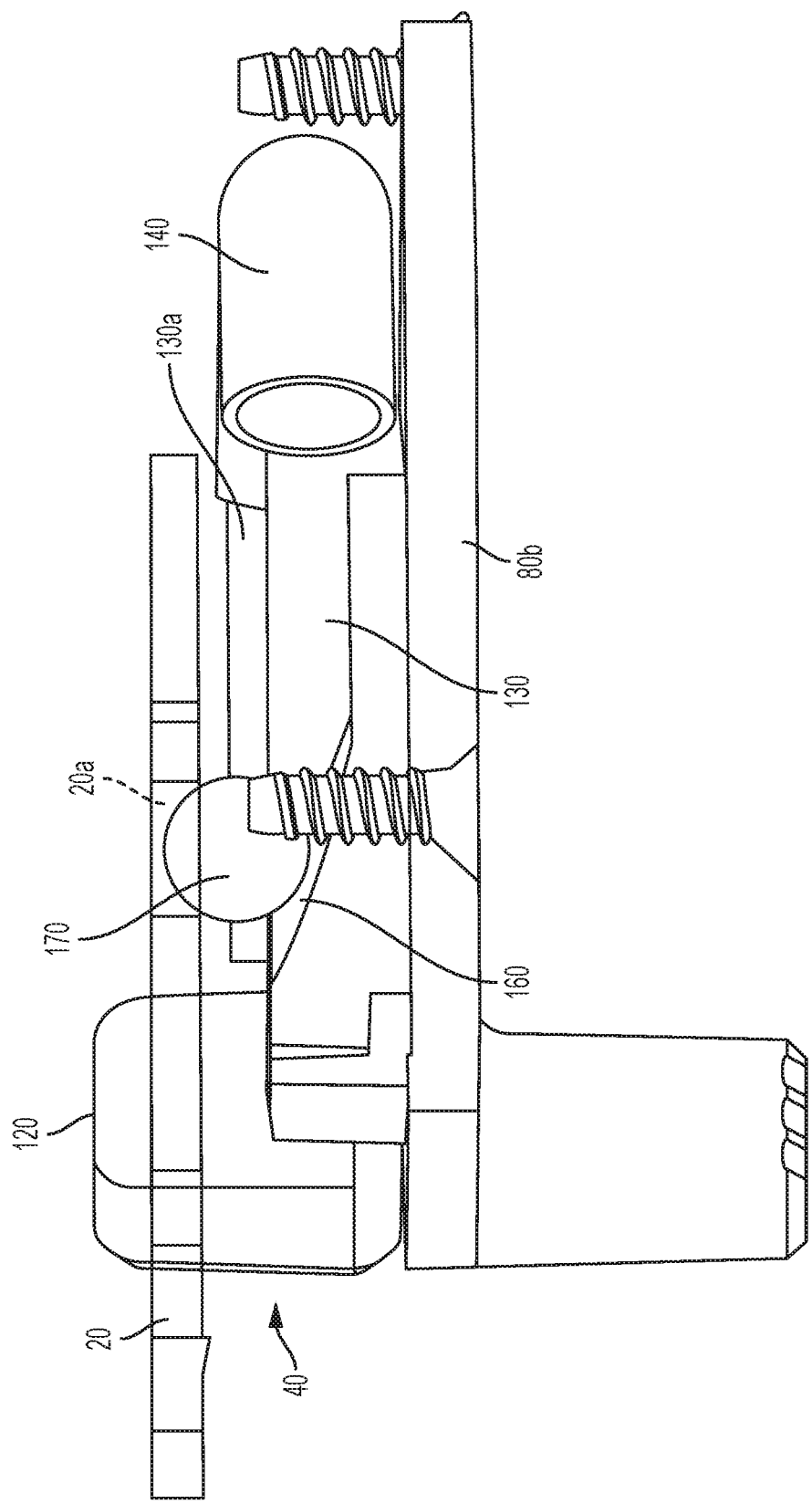
FIG. 7 illustrates an isolated bottom view of the blade receptacle of FIG. 5, with a left side housing portion thereof removed.

The locking of a blade 20 relative to the blade receptacle 80 (and release therefrom via rotation of the blade release actuator 40) may be further appreciated with reference to FIG. 7, which shows a side view of the blade receptacle 80 with the left receptacle side 80*a* removed while depicting the right receptacle side 80*b*. The view of FIG. B also shows the saw blade 20 as transparent, so that a lock engaging region 20*a* is visible therein from the illustrated perspective. It may be appreciated that in various embodiments the lock engaging region 20*a* may comprise a hole formed in the saw blade 20, as in the illustrated embodiment, or may comprise a hook shape or any other appropriate shape engageable by a lock. As may further be appreciated in FIG. 7, the plate 130 includes a ramp 160 on which a lock member 170 rests. In the illustrated embodiment the lock member 170 is a ball (e.g., a metal ball bearing, such as one formed from steel), while in other embodiments other bodies that may traverse the ramp 160 are possible. In an embodiment, a portion of the blade receptacle 80 (e.g., a portion of the left receptacle side 80*a* in the illustrated embodiment) may provide a channel housing for the lock member 170, such that the lock member 170 may move laterally into and out of the plane of the lock engaging region 20*a* when the ramp 160 closes a gap between the plane of the lock engaging region 20*a* and the right receptacle side 80*b* through the ramped thickness of the plate 130 wedging the lock member 170 into the lock engaging region 20*a*. As such, while the blade release actuator 40 is in the lock position, the lock member 170 is held extending into the lock engaging region 20*a* of the blade 20. It may be appreciated that as the blade release actuator 40 is rotated from the illustrated blade locked position to the blade release position, the lock member 170 may fall away from the plane of the lock engaging region 20*a* (e.g., under force of gravity), or otherwise might be displaceable away from the lock engaging region 20*a* (e.g., by camming out) as the saw blade 20 is pulled away from the blade receptacle 80 when the blade release actuator is in the blade release position.

Figure 8:
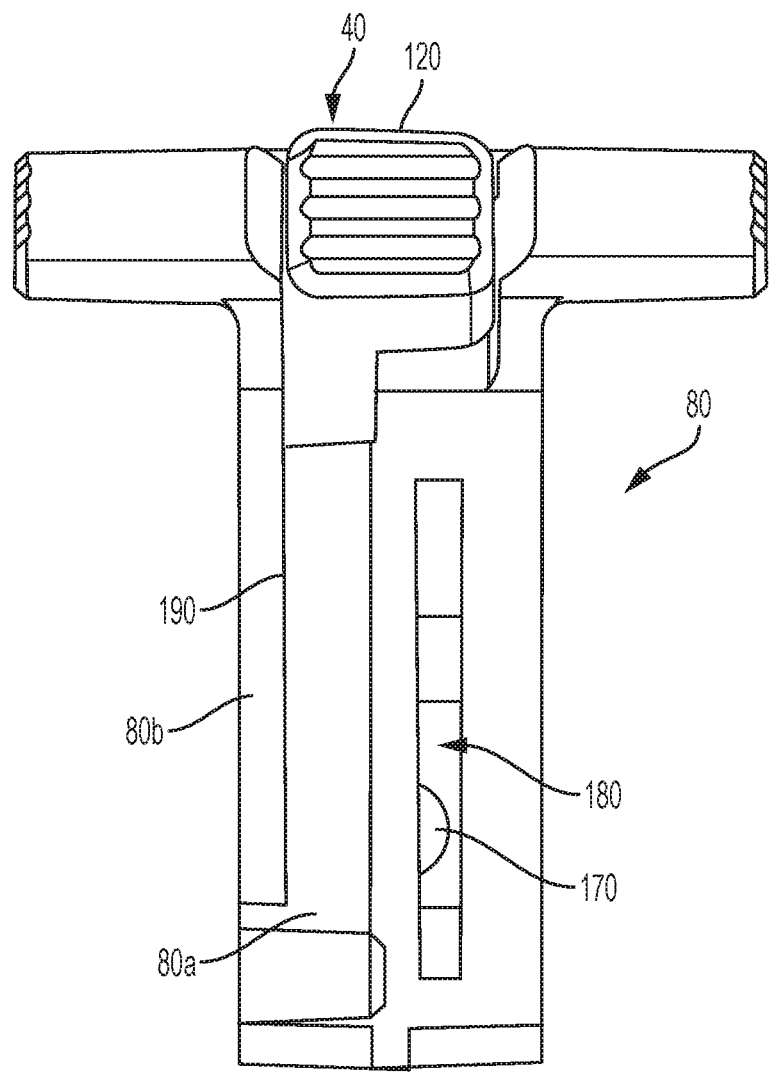
FIG. 8 illustrates an isolated front view of the blade receptacle of FIG. 5, showing an opening formed therein to receive the saw blade therein.

FIG. 8 illustrates an isolated front view of the blade receptacle 80 with the blade release actuator 40 received therein. As further visible in the view of FIG. 8, the left receptacle side 80*a* (visible on the right as viewed from the front) may include an opening 180 configured to receive the saw blade 20 therein. As is further visible in this view, the lock member 170 protrudes into the opening 180 when the blade release actuator is in the blade locked position, regardless of the presence or absence of the saw blade 20. While in the illustrated embodiment the opening 180 is formed in the left receptacle side 80*a*, as discussed previously in other embodiments the assembly of the left receptacle side 80*a* and the right receptacle side 80*b* may provide for other seams therebetween, such as one extending through the opening 180, as opposed to the illustrated embodiment where the blade release actuator is generally received in the left receptacle side 80*a*, while the right receptacle side 80*b* encloses it therein with an offset seam 190 separating the two sides of the blade receptacle 80. It may be appreciated that the opening 180 extending at an outer surface of the blade receptacle 80 may facilitate insertion of a saw blade 20 into the blade receptacle 80 at a plurality of angled orientations of the blade receptacle 80 in embodiments where the saw blade 20 is pivotable into different angles relative to the housing 30.

Figure 9:
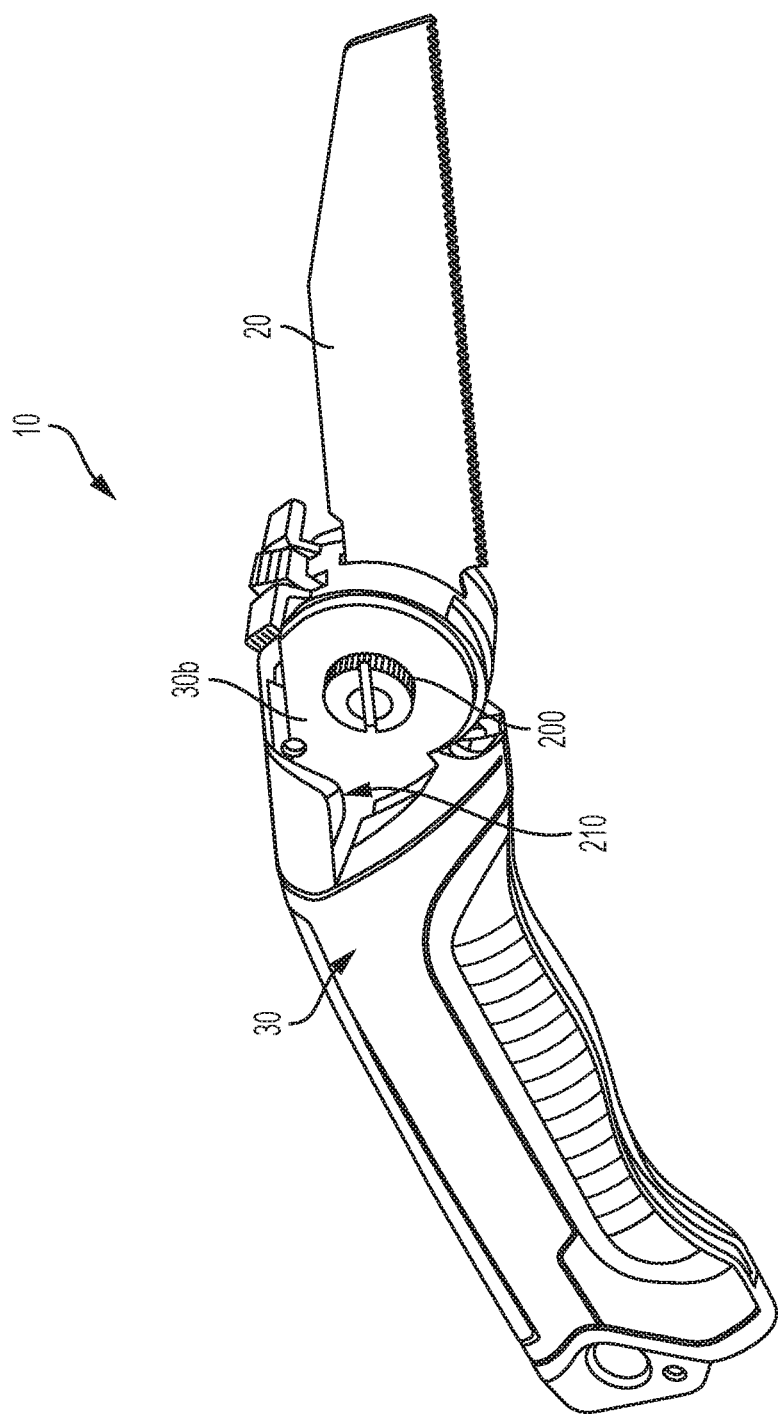
FIG. 9 illustrates a right perspective view of the multi saw of FIG. 1, in an unfolded configuration.
Figure 10:
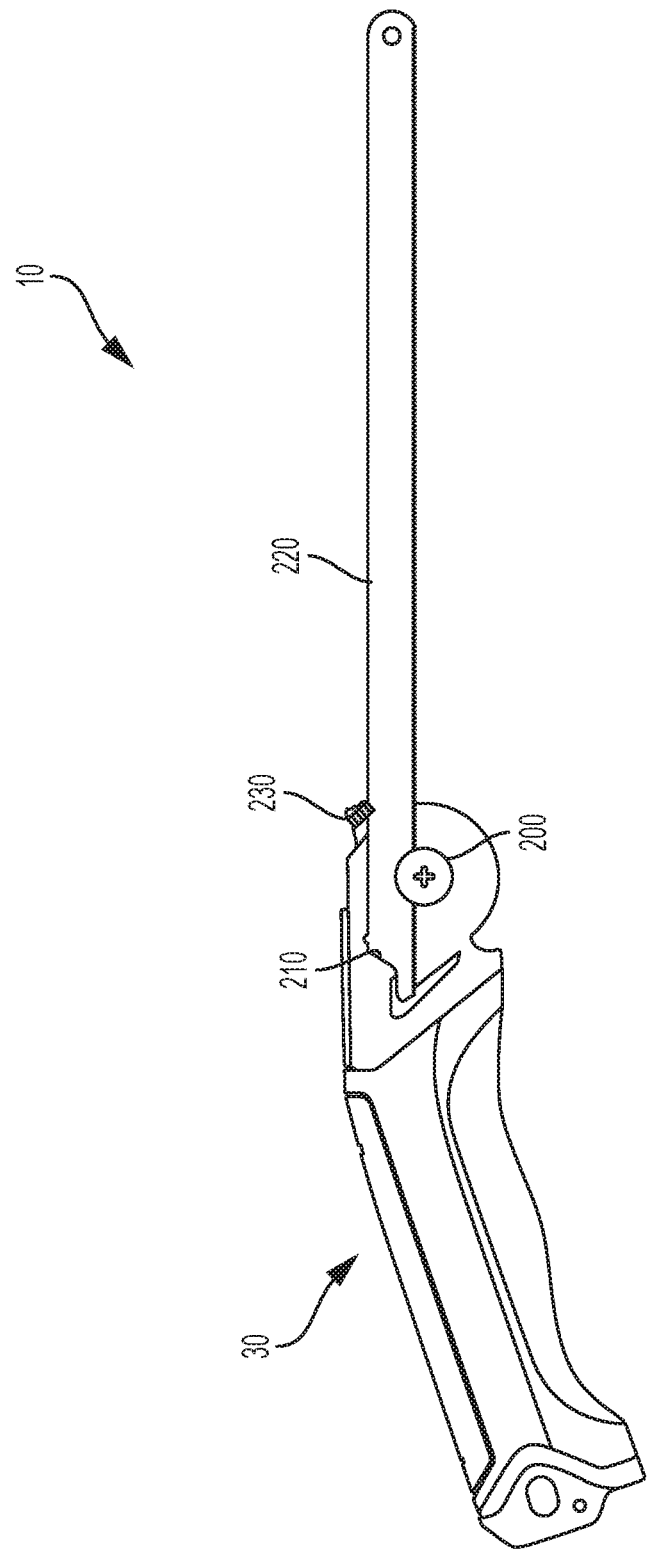
FIG. 10 illustrates a right side view of the multi saw of FIG. 1, with the removable reciprocating saw blade removed, but a hacksaw blade installed therein.

In some embodiments, the multi saw 10 may be configured to receive both reciprocating saw blades 20 as well as conventional hacksaw blades. As may be appreciated with reference to the a right perspective view of the multi saw 10 in FIG. 9, and the right side view of the multi saw 10 in FIG. 10, in an embodiment the multi saw 10 may include a thumbscrew 200 which may be tightened or loosened to provide a variable gap between the thumbscrew 200 and the housing 30. As shown in FIGS. 9 and 10, in an embodiment the housing 30 (e.g., the right housing side 30b in the illustrated embodiment) may include a hacksaw blade channel 210 formed therein which may selectively receive a hacksaw blade 220 slid therein. It may be appreciated that by tightening the thumbscrew 200 when the hacksaw blade 220 is received in the hacksaw blade channel 210, the hacksaw blade 220 may be clamped against the housing 30 and thus fixed relative to the housing 30. As further shown in FIG. 10, in an embodiment other portions of the housing 30 may be shaped to assist in retention of the hacksaw blade 220. For example, as shown, a flange 230 of the right receptacle side 80b may extend outwards over the right housing side 30b, providing an additional point of contact for the hacksaw blade 220 forward of the thumbscrew 200 and the engaging portions of the hacksaw blade channel 210.

It may be appreciated that the components described herein may be of different constructions or configurations, including but not limited to one or more being comprised of different material choices. For example, the components described herein may each be constructed from a variety of materials, including but not limited to one or more plastics, metals, rubbers, elastomers, or any other appropriate material choice. For example, in an embodiment one or more of the components may be formed of aluminum (e.g., machined aluminum), iron (e.g., steel), or any other appropriate material. In some embodiments, the material choices may differ from component to component.

Although aspects of the invention have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A tool comprising:
   a housing;
   a blade receptacle within the housing configured to receive a removable saw blade having a lock engaging region, such that the removable saw blade extends along a ray of blade extension; and
   a blade release actuator adjacent to the blade receptacle, the blade release actuator being rotatable about a blade release actuator axis and configured to selectively move a lock member into the lock engaging region;
   wherein the blade release actuator comprises a ramp on which the lock member rests;
   wherein rotation of the blade release actuator rotates the ramp under the lock member from a) a blade locked position where the lock member is pushed by the ramp generally parallel to the blade release actuator axis into the lock engaging region of the removable saw blade when positioned in the blade receptacle to lock the removable saw blade relative to the tool, to b) a blade release position where the ramp is rotated to create a gap between the lock engaging region and the blade release actuator such that the saw blade is removable from the tool;
   wherein the ray of blade extension is generally perpendicular to the blade release actuator axis;
   wherein the blade receptacle is rotatable relative to the housing such that an angle formed between the ray of blade extension and an extension of the housing may vary; and
   further comprising an opening in the housing such that a blade received in the blade receptacle is selectively foldable into the housing while the blade remains received in the blade receptacle.

2. The tool of claim 1, wherein the lock member comprises a ball.

3. The tool of claim 1, wherein the blade release actuator is biased into the blade locked position.

4. The tool of claim 3, wherein the blade release actuator is biased by a spring received in the blade receptacle that abuts a portion of the blade release actuator.

5. The tool of claim 1, wherein the blade receptacle comprises a channel housing for the lock member limiting movement of the lock member to lateral movement into and out of a plane of the lock engaging region.

6. The tool of claim 1, wherein the blade receptacle is rotatable about the blade release actuator axis.

7. The tool of claim 1, wherein the blade receptacle comprises an outer periphery with a plurality of indentations, wherein a blade pivot actuator is configured to selectively lock the removable saw blade received in the blade receptacle into an angled position relative to the housing associated with one of the plurality of indentations.

8. The tool of claim 7, wherein the blade pivot actuator is laterally movable between a position engaging a selected one of the plurality of indentations to a position disengaged from the selected one of the plurality of indentations.

9. The tool of claim 8, wherein the blade pivot actuator is biased into the position engaging the selected one of the plurality of indentations.

10. The tool of claim 9, wherein the blade pivot actuator is biased by a leaf spring coupled between the housing and the blade pivot actuator.

11. The tool of claim 7, wherein the blade receptacle comprises an indentation associated with the angled positions being one of 180°, 160°, 135°, 115°, 90°, 45°, and 0° relative to the housing.

12. The tool of claim 1, wherein the blade receptacle comprises an opening at an outer surface of the tool when the blade receptacle is rotated so that the opening is not received in the housing, the opening presenting a defined space sized and shaped to receive the saw blade into the blade receptacle.

13. The tool of claim 1, further comprising a hacksaw blade receptacle formed in the housing.

14. The tool of claim 13, further comprising a thumbscrew configured to tighten a hacksaw blade received in the hacksaw blade receptacle against the housing to fix the hacksaw blade relative to the housing.

15. The tool of claim 13, wherein the thumbscrew extends along the blade release actuator axis.

16. The tool of claim 1, wherein the rotation of the blade release actuator to rotate the ramp under the lock member moves the blade release actuator relative to the blade receptacle, and wherein rotation of the blade receptacle causes a corresponding rotation of the blade release actuator such that the blade release actuator does not move relative to the blade receptacle.

* * * * *